US010156313B2

(12) United States Patent
Chappell et al.

(10) Patent No.: US 10,156,313 B2
(45) Date of Patent: Dec. 18, 2018

(54) VENT HOSE CAP

(71) Applicants: GM GLOBAL TECHNOLOGY OPERATIONS LLC, Detroit, MI (US); CADILLAC RUBBER & PLASTICS INC, Cadillac, MI (US)

(72) Inventors: Christopher C. Chappell, Commerce Township, MI (US); Craig R. Brooks, Harrison Township, MI (US); Lynn Boelstler, Harrison Township, MI (US); Thomas John Sanday, Harrison Township, MI (US); David Joseph Wojciechowski, Swartz Creek, MI (US); William R. Gale, Canton, MI (US)

(73) Assignees: GM GLOBAL TECHNOLOGY OPERATIONS LLC, Detroit, MI (US); CADILLAC RUBBER & PLASTICS INC, Cadillac, MI (US)

( * ) Notice: Subject to any disclaimer, the term of this patent is extended or adjusted under 35 U.S.C. 154(b) by 0 days.

(21) Appl. No.: 15/476,246

(22) Filed: Mar. 31, 2017

(65) Prior Publication Data

US 2018/0283592 A1    Oct. 4, 2018

(51) Int. Cl.
*F16L 55/115*    (2006.01)
*F16K 24/04*    (2006.01)
*F16L 3/00*    (2006.01)

(52) U.S. Cl.
CPC ............ *F16L 55/115* (2013.01); *F16K 24/04* (2013.01); *F16L 3/003* (2013.01)

(58) Field of Classification Search
CPC ..... F16H 57/027; F16H 57/04; Y10T 74/2186
USPC ...... 138/89, 89.1–89.4; 220/799, 784, 366.1, 220/367.1
See application file for complete search history.

(56) References Cited

U.S. PATENT DOCUMENTS

| | | | | |
|---|---|---|---|---|
| 4,147,096 | A * | 4/1979 | Caswell ................. | F16K 24/04 137/513.5 |
| 4,190,087 | A * | 2/1980 | Herman ................. | B65D 59/06 138/96 R |
| 5,024,345 | A * | 6/1991 | Deweerdt ............. | F16H 57/027 138/89 |
| 6,513,550 | B1 * | 2/2003 | Kwilosz ................. | F16K 24/04 137/587 |
| 7,484,533 | B1 * | 2/2009 | Arndt .................... | F16L 55/115 138/89 |

* cited by examiner

*Primary Examiner* — Patrick F Brinson

(57) ABSTRACT

A device for venting a hose is disclosed. In some embodiments, the device includes a housing having a cylindrical sidewall and an endwall, the sidewall defining an inner housing surface and an outer housing surface, an opening extending through the sidewall, and a hose retention system extending from the inner housing surface.

19 Claims, 1 Drawing Sheet

VENT HOSE CAP

INTRODUCTION

The present invention relates generally to a cap, and more specifically, to a vent hose cap which is used to prevent water intrusion into a vent hose while allowing gas to escape freely from the vent hose.

A vent hose is often shielded in order to minimize the intrusion of foreign objects and/or liquid into the vent hose while also allowing gas to freely escape from the vent hose. However, many vent hose cap designs incorporate multiple pieces, increasing the complexity of installation.

SUMMARY

Embodiments according to the present disclosure provide a number of advantages. For example, embodiments according to the present disclosure enable easier installation as well as reducing installation errors by incorporating poka-yoke features.

In one aspect, a device for venting a hose includes a housing having a cylindrical sidewall and an endwall, the sidewall defining an inner housing surface and an outer housing surface, an opening extending through the sidewall, and a hose retention system extending from the inner housing surface.

In some aspects, the hose retention system includes at least two ribs extending radially from the inner housing surface and a hose retention member encircling a longitudinal centerline of the housing. In some aspects, the hose retention member defines an inner diameter that is less than an inner diameter of the housing.

In some aspects, the hose retention system includes three ribs extending radially from the inner housing surface.

In some aspects, the hose retention system includes four ribs extending radially from the inner housing surface, the four ribs spaced equally around the inner housing surface.

In some aspects, the three ribs form a Y-shape inside the housing with the hose retention member located where the three ribs intersect.

In some aspects, the four ribs form an X-shape inside the housing with the hose retention member located where the four ribs intersect.

In some aspects, the device includes a mounting tab extending radially outward from the outer housing surface.

In some aspects, the opening is proximate to the hose retention system and the mounting tab.

In another aspect, a vent hose cap includes a housing having a cylindrical sidewall and an endwall, the sidewall defining an inner housing surface and an outer housing surface, an opening extending through the sidewall, a mounting tab extending radially outward from the outer housing surface, the mounting tab proximate to the opening, and a hose retention system comprising four retention ribs extending from the inner housing surface towards a longitudinal centerline of the housing and a hose retention member encircling the longitudinal centerline of the housing and connected to each of the four retention ribs.

In some aspects, the hose retention member defines an inner diameter that is less than an inner diameter of the housing.

In some aspects, the four ribs form an X-shape inside the housing.

In some aspects, the opening is proximate to the hose retention system.

In some aspects, the housing, the mounting tab, and the hose retention system are unitarily formed from a moldable composite material.

In yet another aspect, a vent hose cap includes a housing having a cylindrical sidewall, the sidewall defining an inner housing surface and an outer housing surface, a mounting tab extending radially outward from the outer housing surface, and a hose retention system including a plurality of retention ribs extending from the inner housing surface towards a longitudinal centerline of the housing and a hose retention member connected to each of the plurality of retention ribs.

In some aspects, the hose retention member defines an inner diameter that is less than an inner diameter of the housing.

In some aspects, the hose retention system comprises four retention ribs that form an X-shape inside the housing.

In some aspects, the vent hose cap further includes an opening, wherein the opening is proximate to the hose retention system.

In some aspects, the housing, the mounting tab, and the hose retention system are unitarily formed from a moldable composite material.

In some aspects, the hose retention system comprises three retention ribs that extend radially inward from the inner housing surface.

BRIEF DESCRIPTION OF THE DRAWINGS

The present disclosure will be described in conjunction with the following figures, wherein like numerals denote like elements.

Figure 1:
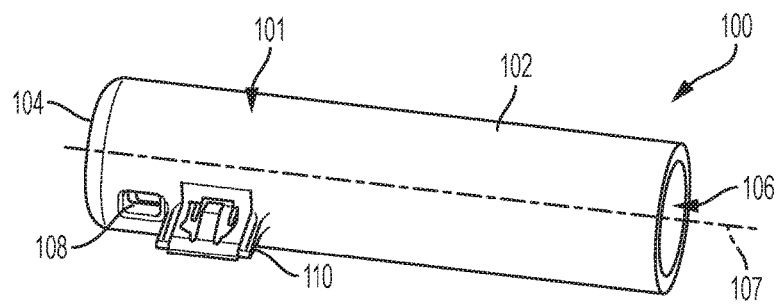
FIG. 1 is a perspective view of a vent hose cap, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. Throughout the figures, similar reference numbers refer to similar components.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover terms such as "first," "second," "third," and so on may be used to describe separate components. Such terminology may include the words specifically mentioned above, derivatives thereof, and words of similar import.

A unitary vent hose cap is disclosed in the accompanying drawings. A one-piece vent hose cap provides many advantages over previous designs, including improved installation and assembly and reduced water intrusion into the hose being vented. As disclosed below, an integrated hose retention system includes two or more ribs extending radially inward from the inside surface of the cap. The hose retention system holds and supports the hose and allows airflow back through the cap. A window or opening formed through the side of the cap near the hose retention system allows the installer to view the hose end to ensure proper assembly while also preventing direct access to the hose to provide anti-siphoning benefits.

Figure 2:
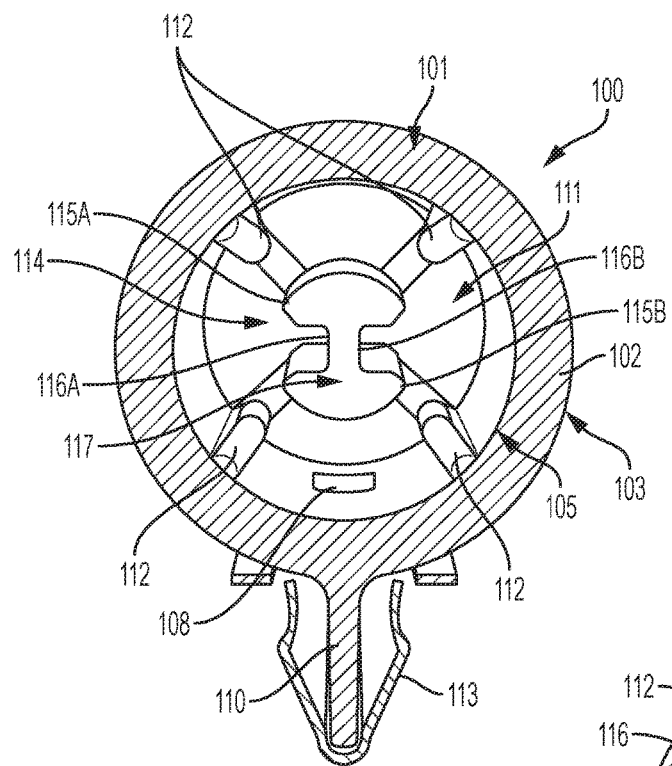
FIG. 2 is a perspective end view of the vent hose cap of FIG. 1.

FIGS. 1 and 2 illustrate a vent hose cap 100, according to an embodiment. The vent hose cap 100 includes a cylindrical housing 101 defined by a sidewall 102 and having a longitudinal centerline axis 107. The housing 101 is closed on one end by an endwall 104. The sidewall 102 and the endwall 104 define an interior 106. An opening 108 passes through the sidewall 102. The opening 108 allows an installer to view a position of the hose within the interior 106 to confirm proper installation of the vent hose, as discussed in greater detail below.

The sidewall 102 defines an outer surface 103 and an inner surface 105. A mounting tab 110 extends radially outward from the outer surface 103 of the housing 101. In some embodiments, the mounting tab 110 extends along at least a portion of the length of the housing 101 such that the length of the mounting tab 110 extends parallel to the longitudinal centerline 107 and the length of the mounting tab 110 is less than the length of the housing 101.

As shown in FIG. 2, the housing 101 includes a hose retention system 111. The hose retention system 111 includes a plurality of retention ribs 112 extending radially inward from the inner surface 105 of the sidewall 102. In some embodiments, as shown in FIG. 2, four (4) retention ribs 112 extend radially inward from the inner surface 105 of the sidewall 102. In some embodiments, the retention ribs 112 are approximately equally spaced along the inner surface 105 of the sidewall 102.

In some embodiments, such as the embodiment shown in FIG. 2, the retention ribs 112 are positioned in approximately an X-shape when viewed from the open end of the housing 101. The ribs 112 are joined together at their radially inward ends by a hose retention member 114.

The hose retention member 114 encircles the longitudinal axis 107 of the housing 101. The hose retention member 114 includes a first retention member 115A and a second retention member 115B connected by connection members 116A, 116B. In some embodiments, the first and second retention members 115A, 115B are semi-circular in shape and, together with the connection members 116A, 116B form an approximately I-shaped hose opening 117. In some embodiments, the hose retention member 114 expands to a maximum outer diameter of approximately 9 mm such that the hose retention member 114 accommodates a hose having an inner diameter of approximately 8 mm. In other embodiments, the outer diameter and inner diameter of the hose retention member 114 and the vent hose cap 100 are sized to accommodate hoses having inner diameters as small as 8 mm and as large as 20 mm. The hose retention member 114 and the vent hose cap 100 may be sized to accommodate any hose diameter within the minimum diameter of 8 mm and the maximum diameter of 20 mm, as recognized by those skilled in the art. The hose retention member defines an inner diameter that is less than an inner diameter of the housing 101.

Insertion of a hose into the hose retention member 114 causes the connection members 116A, 116B to flex radially outwards, allowing the hose to pass through the opening 117 while maintaining a compressive and friction hold on the outside diameter of the hose. The compression exerted on the hose, along with friction between the outside diameter of the hose and the hose retention member 114 holds the hose in place within the vent cap 100. The window or opening 108 passes through both the outer surface 103 and the inner surface 105 of the sidewall 102 to allow visual inspection of the hose installation within the vent hose cap 100. The window 108 is positioned such that when the hose is correctly inserted within the hose retention member 114, the hose is visible through the window 108, allowing for visual confirmation of correct hose insertion within the cap 100. While the hose is visible through the window 108, the window 108 does not permit siphoning from the hose.

When the hose is correctly inserted within the hose retention member 114, the hose is positioned approximately within the center of the interior space 106, allowing airflow within the interior space 106 of the cap 100. The retention ribs 112 are, in some embodiments, formed as ribs extending from the inner surface 105 of the housing 101 and are positioned such that airflow through the cap 100 is minimally impeded, as recognized by those skilled in the art.

Figure 3:
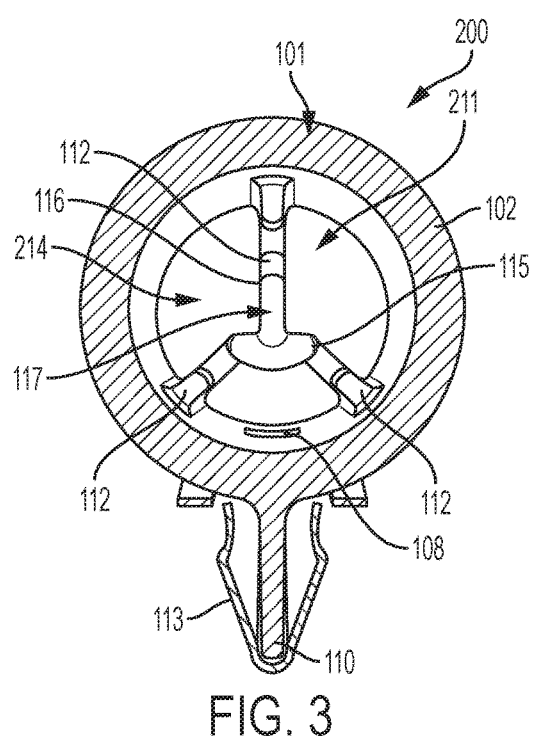
FIG. 3 is a perspective end view of another embodiment of a vent hose cap.

FIG. 3 illustrates a cross-sectional view of a hose vent cap 200, according to another embodiment. The vent cap 200 is similar in external shape and configuration to the vent cap 100 shown in FIG. 1. The vent cap 200 includes a cylindrical housing defined by a sidewall 102. An opening 108 passes through the sidewall 102.

As shown in FIG. 3, the vent cap 200 includes a hose retention system 211. The hose retention system 211 includes a plurality of retention ribs 112 extending radially inward from the inner surface of the sidewall 102. In some embodiments, as shown in FIG. 3, three (3) retention ribs 112 extend radially inward from the inner surface of the sidewall 102. In other embodiments, the hose retention system 211 includes two or more retention ribs 112.

In some embodiments, such as the embodiment shown in FIG. 3, the retention ribs 112 are positioned in approximately a Y-shape when viewed from the open end of the housing of the vent cap 200. The ribs 112 are joined together at their radially inward ends by a hose retention member 214.

The hose retention member 214 encircles the longitudinal axis 107 of the housing 101. The hose retention member 214 includes a retention member 115 connected to connection member 116. In some embodiments, retention member 115 is semi-circular in shape and, together with the connection member 116 forms a hose opening 117. In some embodiments, the hose retention member 214 expands to a maximum outer diameter of approximately 9 mm such that the hose retention member 214 accommodates a hose having an inner diameter of approximately 8 mm. In other embodiments, the outer diameter and inner diameter of the hose retention member 214 and the vent hose cap 200 are sized to accommodate hoses having inner diameters as small as 8 mm and as large as 20 mm. The hose retention member 214 and the vent hose cap 200 may be sized to accommodate any hose diameter within the minimum diameter of 8 mm and the maximum diameter of 20 mm, as recognized by those skilled in the art.

Insertion of a hose into the hose retention member 214 causes the connection member 116 to flex radially outwards, allowing the hose to pass through the opening 117 while maintaining a compressive and friction hold on the outside diameter of the hose. The compression exerted on the hose, along with friction between the outside diameter of the hose and the hose retention member 214 holds the hose in place within the vent cap 200. As discussed above with respect to FIG. 2, the window or opening 108 passes through both the outer surface and the inner surface of the sidewall 102 to allow visual inspection of the hose installation within the vent hose cap 200. The window 108 is positioned such that when the hose is correctly inserted within the hose retention member 214, the hose is visible through the window 108, allowing for visual confirmation of correct hose insertion within the cap 200. While the hose is visible through the window 108, the window 108 does not permit siphoning from the hose.

When the hose is correctly inserted within the hose retention member 214, the hose is positioned approximately within the center of the interior space 106, allowing airflow within the interior space 106 of the cap 200. The retention ribs 112 are, in some embodiments, formed as ribs extending from the inner surface of the housing 101 and are positioned such that airflow through the cap 200 is minimally impeded, as recognized by those skilled in the art.

With reference to FIGS. 2 and 3, a clip 113 can be used along with the mounting tab 110 to secure the vent hose cap 100, 200 to a slotted bracket. The mounting tab 110 along with clip 113 illustrate one means of securing the vent hose cap 100, 200 to another component, such as a vehicle structural component, but other means of securing the vent hose cap 100, 200 may be used as recognized by those skilled in the art.

In some embodiments, the vent hose caps 100 and 200 are unitarily formed from a moldable composite material, such as a glass-filled polymer or glass-filled plastic comprising short glass fibers in a matrix of a polymer material, such as, for example and without limitation, 30% glass-filled nylon type 6/6, but those skilled in the art will recognize a range of equivalent substitutions. In some embodiments, the vent hose caps 100 and 200 are formed through injection or compression molding.

It should be emphasized that many variations and modifications may be made to the herein-described embodiments, the elements of which are to be understood as being among other acceptable examples. All such modifications and variations are intended to be included within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context dead y indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A device for venting a hose, the device comprising a housing having a cylindrical sidewall and an endwall, the sidewall defining an inner housing surface and an outer housing surface, an opening extending through the sidewall, a hose retention system extending from the inner housing surface, and a mounting tab extending radially outward from the outer housing surface.

2. The device of claim 1, wherein the hose retention system includes at least two ribs extending radially from the inner housing surface and a hose retention member encircling a longitudinal centerline of the housing.

3. The device of claim 2, wherein the hose retention member defines an inner diameter that is less than an inner diameter of the housing.

4. The device of claim 2, wherein the hose retention system includes three ribs extending radially from the inner housing surface.

5. The device of claim 2, wherein the hose retention system includes four ribs extending radially from the inner housing surface, the four ribs spaced equally around the inner housing surface.

6. The device of claim 4, wherein the three ribs form a Y-shape inside the housing with the hose retention member located where the three ribs intersect.

7. The device of claim 5, wherein the four ribs form an X-shape inside the housing with the hose retention member located where the four ribs intersect.

8. The device of claim 1, wherein the opening is proximate to the hose retention system and the mounting tab.

9. A vent hose cap comprising a housing having a cylindrical sidewall and an endwall, the sidewall defining an inner housing surface and an outer housing surface, an opening extending through the sidewall, a mounting tab extending radially outward from the outer housing surface, the mounting tab proximate to the opening, and a hose retention system comprising four retention ribs extending from the inner housing surface towards a longitudinal centerline of the housing and a hose retention member encircling the longitudinal centerline of the housing and connected to each of the four retention ribs.

10. The vent hose cap of claim 9, wherein the hose retention member defines an inner diameter that is less than an inner diameter of the housing.

11. The vent hose cap of claim 9, wherein the four ribs form an X-shape inside the housing.

12. The vent hose cap of claim 9, wherein the opening is proximate to the hose retention system.

13. The vent hose cap of claim 9, wherein the housing, the mounting tab, and the hose retention system are unitarily formed from a moldable composite material.

14. A vent hose cap comprising a housing having a cylindrical sidewall, the sidewall defining an inner housing surface and an outer housing surface, a mounting tab extending radially outward from the outer housing surface, and a hose retention system comprising a plurality of retention ribs extending from the inner housing surface towards a longitudinal centerline of the housing and a hose retention member connected to each of the plurality of retention ribs.

15. The vent hose cap of claim 14, wherein the hose retention member defines an inner diameter that is less than an inner diameter of the housing.

16. The vent hose cap of claim 14, wherein the hose retention system comprises four retention ribs that form an X-shape inside the housing.

17. The vent hose cap of claim 14 further comprising an opening, wherein the opening is proximate to the hose retention system.

18. The vent hose cap of claim 14, wherein the housing, the mounting tab, and the hose retention system are unitarily formed from a moldable composite material.

19. The vent house cap of claim 14, wherein the hose retention system comprises three retention ribs that extend radially inward from the inner housing surface.

* * * * *